Feb. 23, 1971  D. D. KORELL  3,564,936

THUMB-OPERATED INTERLOCKED TWO AXIS, JOYSTICK ACTUATOR

Filed Sept. 18, 1969

INVENTOR.
DONALD D. KORELL

BY  R. W. Anderson

AGENT

United States Patent Office 3,564,936
Patented Feb. 23, 1971

3,564,936
THUMB-OPERATED INTERLOCKED TWO AXIS,
JOYSTICK ACTUATOR
Donald D. Korell, Marion, Iowa, assignor to Collins Radio
Company, Cedar Rapids, Iowa, a corporation of Iowa
Filed Sept. 18, 1969, Ser. No. 859,061
Int. Cl. G05g 11/00
U.S. Cl. 74—483 7 Claims

ABSTRACT OF THE DISCLOSURE

An actuator mechanism for selectively applying force to a shaft transverse of the shaft longitudinal axis and along mutually perpendicular axes. Actuating member pairs address the shaft sides along the two axes and have a transverse dimension substantially equal that of the shaft such that application of force in either direction along one of the axes by either one of the actuating member pairs provides an interlock to prevent force application along the other of the axes.

---

This invention relates generally to actuator mechanisms and more particularly to a thumb-operated mechanism for selectively applying deflection forces to a shaft member along mutually perpendicular transverse axes and including means obviating simultaneously application of such force and preventing application of torque to the actuated shaft during the application of forces thereon.

The present invention will be described with respect to its application to deflection of a joystick type force sensor of the type employing a shaft member which may be cantiliver-mounted, whereupon application of forces to the shaft applies a moment to the shaft arm resulting in a deflection effecting an output from an associated transducer which is proportional to the force applied and is sensed in accordance with the direction of application of the force.

In certain applications in general, and in particular in applications employing a cantilever beam in conjunction with oppositely mounted pairs of strain gauges to form a transducer, it may be desirable for a particular mode of operation, or in some instances imperative in order to prevent damage to the transducer, that movement of the cantilever beam be constrained to mutually perpendicular axes. The object of the present invention is accordingly the provision of a shaft actuator mechanism which might comprise a part of a force sensing mechanism which will assure that the force sensor shaft be deflected or have force applied thereto along mutually perpendicular axes only. A further object of the present invention is provision of a shaft actuator mechanism for use in incorporation with a deflectable shaft whereby application of force may be applied to the shaft along one of two mutually perpendicular axes while providing a mechanical lock to prevent by application of force and deflection of the shaft along the other of the mutually perpendicular axes.

A further object of the present invention is the provision of a shaft actuator mechanism for use in conjunction with a deflectable shaft by means of which application of force may be made to the shaft along either one of two mutually perpendicular axes to the exclusion of the other in a manner such that no torque can be applied to the shaft.

The invention is featured in provision of a shaft actuator mechanism in accordance with the above objectives which may be easily and smoothly actuated by simple thumb pressure.

These and other features and objects of the present invention will become apparent upon reading the following description in conjunction with the accompanying drawings in which.

Figure 1:
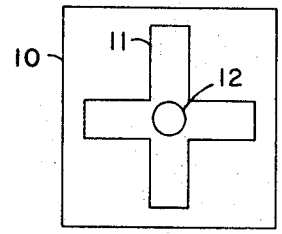
FIG. 1 is a diagrammatic representation of a prior art solution to a means for limiting shaft deflection along two mutually perpendicular axes.

FIG. 1 illustrates a shaft 12 which might be the input shaft of a force sensor. Shaft 12 might be, for example, a cantilever beam member operating in conjunction with appropriate transducers so as to provide an output from a transducer proportional to transverse force applied to the end of shaft 12 and having a sense in accordance with the direction of the application of force. Known transducers may employ strain gauges mounted on mutually opposite sides of shaft 12 in conjunction with appropriate bridge circuitry to develop electrical outputs having a sense and amplitude respectfully proportional to the direction of the application of a force to the shaft 12 and to the magnitude of the force.

As above mentioned, in certain applications the type of transducers associated with the deflectable shaft 12 may necessitate that no torque be applied to the shaft 12. It may also be desirable to limit the application of forces to the shaft 12 such that deflections may occur about mutually perpendicular axes only.

The latter type of applications might be included, for example, in an aircraft flight control system where it is desirable to provide the pilot with a thumb-actuated transducer to introduce band and pitch control by application of thumb pressure inputs to an appropriate transducer. In this application the shaft actuator mechanism might be employed with a universal type transducer which in the absence of such a mechanism is deflectable in any desired direction, in which case the transducer would develop a composite or vector type of output.

The present invention in a broader sense provides a shaft actuator mechanism for displacing a shaft member transverse of its longitudinal axis and which constrains the application of force to two mutually perpendicular axes, either one to the exclusion of the other, and which is so designed that the application of torque to the shaft is prevented.

Figure 2:
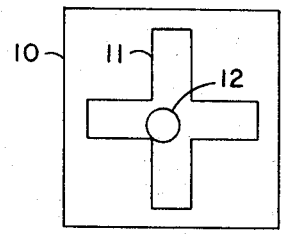
FIG. 2 is a diagrammatic representation of the mechanism of FIG. 1 illustrating a possible composite deflection.

FIG. 1 illustrates a known expedient which might be employed in conjunction with a force sensor shaft. An external plate member 10 with a cross-shaped cutout pattern 11 may be placed over the input shaft 12 of the sensor and fixed to the force sensor. With this expedient most of the shaft travel; that is, right, left, up and down; is restricted to the two preferred axes. However, some movement of the round shaft 12 along a non-preferred axis is always possible as illustrated in FIG. 2 where the shaft is essentially in its neutral or center position. The diameter of the shaft cannot be such as to prevent motion other than along the preferred axes with the cross-shaped cutout pattern 11, and the round shaft member 12 may be deflected simultaneously in both the up-down and right-left directions at the intersection of the patterns. It is also apparent from the configuration of FIG. 2 that a force may be applied to the shaft 12 within this central region so as to exert a torque on the shaft 12.

Figure 3:
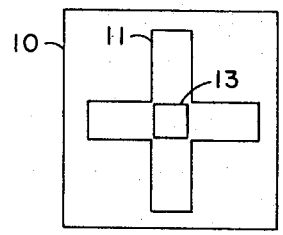
FIG. 3 is a diagrammatic representation of an improved means of applying force to a deflectable shaft along two mutually perpendicular axes.
Figure 4:
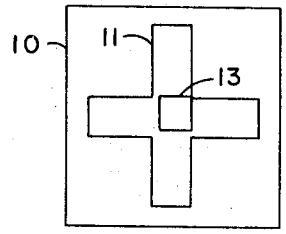
FIG. 4 is a diagrammatic representation showing the possible application of torque to the shaft of the device of FIG. 3.

FIG. 3 illustrates a partial solution to the problem introduced by the mechanism of FIGS. 1 and 2 wherein the input shaft is made to be square in cross section. By this expedient the square shaft 13 may be made more precisely in conformance with the width of the cross-shaped cutout 11 such that a composite application of force to the shaft 13 within the central or neutral area is minimized. However, as depicted in FIG. 4, when force is applied so as to impart a movement to the right of shaft 13 at the same time that there is a slight inadvertent movement in the upward direction, two problems occur. First, a torque is applied to the shaft of the sensor in a counterclockwise direction and, secondly, the movement will not be smooth and easy.

Figure 5:
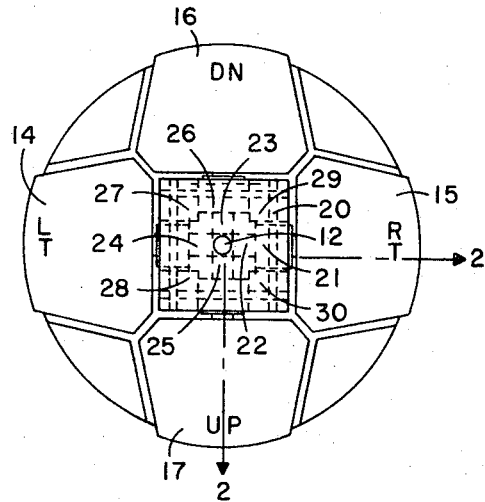
FIG. 5 is a top view of an improved shaft actuator mechanism in accordance with the present invention.
Figure 6:
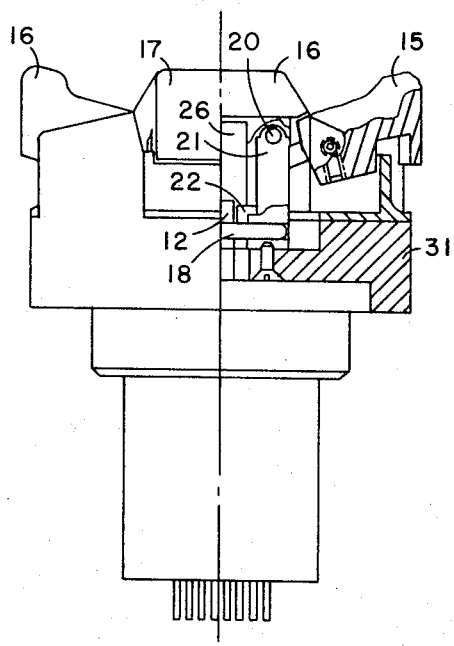
FIG. 6 is an elevation view of the improved shaft actuator mechanism including a partial section along the line 2—2 of FIG. 5.

In accordance with the present invention a shaft actuator mechanism as depicted in FIGS. 5 and 6 may be added to a force sensor in operative engagement with the shaft such that the application of force, and thus shaft deflection, is imparted along either one of two mutually perpendicular axes to the exclusion of the other and which, by its cooperative engagement with the shaft, prevents the application of torque to the shaft.

As generally depicted in FIG. 5, the shaft actuator mechanism of the invention comprises four buttons, 14, 15, 16 and 17. Each of the buttons is associated with a pivot arm member such that depression of any one of the buttons deflects the shaft 12 of the associated force center. For example, if the "RT" button is pushed down, a pivot arm member associated with the button 15 moves the sensor shaft 12 to the left. This action will cause the associated pivot arm of the "LT" button 14 to move upward. The same sequence occurs when the "UP" or "DN" buttons 17 or 16 are pushed. As will be further described, the associated mechanisms cause the force sensor arm 12 to deflect along axes which are perpendicular since the button associated pivot arms rotate about axes which are mutually perpendicular.

As best seen in FIG. 6, the actuator button 15 is affixed to a pivot arm 21 including a lower end member 22 which is in engagement with the periphery of the sensor input shaft 12. With reference to FIG. 5 the pivot arm extension or dog member 22 has a width equal that of the diameter of the sensor input shaft. The pivot arm 21 associated with control button 15 pivots about a shaft 20 which is retained between mounting member 29 and 30, which may be extensions of, or mounted to the base member 31 of the shaft actuator mechanism. Likewise, each of the control buttons 14, 16 and 17 is associated with a shaft actuator mechanism including a lower end member in cooperative engagement with the sensor input shaft 12. With reference to FIG 5 the "DN" button 16 is affixed to and controls the operation of an associated pivot arm 26 including a lower end member 23 which cooperates with the sensor shaft. The "LT" button 14 is affixed to a like pivot arm member including a lower end member 24 in cooperation with the sensor shaft 12. The "UP" button 17 is similarly associated with a pivot arm member including a lower end member 25 in cooperative engagement with the sensor shaft 12. The pivot arm members associated with buttons 16, 14 and 17, as that of pivot arm member 21 associated with button 15, are pivotable about shafts received in the upwardly extending pairs of mounting members. It is noted that the pivot arm end members 22, 23, 24 and 25, which are positioned by depression of the associated control buttons have widths corresponding to the diameter of the sensor shaft 12.

Now with reference to FIG. 6 an O-ring spring member 18 is placed around and in engagement with the lower extremes of the pivot arm members associated with each of the four control buttons to urge all pivot arm members into spring loaded engagement with the sensor shaft 12.

The shaft 12 may be a cantilevered spring and serve then as a return-to-center spring for all control buttons.

In operation, when any one of the buttons 14, 15, 16 or 17 is deflected as by thumb pressure, its associated pivot arm causes the pivot arm lower end member to move in between the lower end members of the pivot arm pair lying along the transverse axis, thus blocking the movement of any of the other pivot arms and the sensor shaft. Thus when control button 15 is depressed, its pivot arm 21 pivots about axis 20 and causes the pivot arm end member 22 to deflect the shaft 12 to the left (FIG. 5) while at the same time the end member 22 is disposed between the end members 23 and 25 normally positionable along the transverse axis. Thus when button 15 is depressed, it forces the shaft 12 to the left, while at the same time causing the "LT" button 14 to pivot upwardly due to the pressure of the shaft 12 on the dog member 24 associated with the pivot arm for the button 14. While this force is being applied, application of force on either the "UP" or "DN" button 17 or 16 cannot move shaft 12 since the dog 22 associated with button 15 is disposed between the dog members 23 and 25. Since the pivot arm dogs are the same width as the diameter of the input shaft 12, any slight movement of one pivot arm will mechanically block movement of those disposed for movement along the transverse axis. Further, when two buttons in the same axis, such as the "RT" button 15 and the "LT" button 14, are pushed with equal force, there can be no movement of the shaft 12. When a button in each of the axes is pushed simultaneously, such as the "RT" button 15 and the "DN" button 16, the corners of the end members of the associated pivot arms contact each other, there is no movement of the sensor shaft, and no torque is applied to the shaft.

The present invention is thus seen to provide a shaft actuator mechanism by means of which the application of deflecting forces to an associated shaft member may be applied only along mutually perpendicular axes and by which the simultaneous application of deflecting forces along both of mutually perpendicular axes is obviated as is the application of torque to the shaft.

What is claimed is:

1. A shaft actuator mechanism for selectively applying forces transverse of the longitudinal axis of a deflectable shaft member along mutually perpendicular axes comprising first, second, third and fourth pivot arm members respectively pivotable about mutually perpendicular axes lying in a plane transverse of the longitudinal axis of said deflectable shaft member, each of said pivot arm members being formed with an end member thereof having a transverse dimension equal that of the transverse dimension of said shaft, said end members being in engagement with the periphery of said shaft member actuated by means associated with each pivot arm member by means of which each of said pivot arm end members may be caused to translate in a plane transverse that of the longitudinal axis of said shaft member, each of said pivot arm members being adapted for movement in response to which said end members are translatable to either side of a normal rest position, whereby displacement of any one of said actuator mechanisms causes the associated pivot arm end member to translate said shaft along one of two mutually perpendicular axes while displacing the coaxial one of said pivot arm members; each of said pivot arm members, upon being translated and effecting a deflection of said shaft, being disposed between the pivot arm end members displaceable along the opposite axis whereupon said shaft is deflectable along one of the two mutually perpendicular axes to the exclusion of the other.

2. A shaft actuator mechanism as defined in claim 1 further including spring means in operable engagement with the end members of each of said actuating arms whereby said end members are urged into peripheral engagement with said shaft.

3. A shaft actuator mechanism as defined in claim 2 wherein said shaft has a round cross section.

4. A mechanism for application of force to a shaft member about mutually perpendicular transverse axes to the exclusion of other axes comprising first and second pairs of actuating mechanisms held in peripheral engagement with respective pairs of opposite shaft sides, each of said actuator means having a cross section substantially equal that of said shaft transverse dimension, means for translating the pairs of actuating mechanisms along one of the shaft transverse axes, each of said actuator mechanisms when effecting a transverse movement of said shaft from a normal rest position being conformingly juxtaposed between the pair of actuating mechanisms along the other of said mutually perpendicular axes whereby any one of the actuating mechanisms in effecting a flexure of said shaft member blocks transverse movement of the other pair of said actuating mechanisms.

5. A mechanism as defined in claim 4 wherein said pairs of actuator mechanisms are held in spring loaded engagement with the periphery of said shaft along mutually perpendicular axes by means of a spring O-ring member in common engagement with each of said actuating mechanisms.

6. A mechanism as defined in claim 5 wherein each of said actuating mechanisms comprises an arm member having a substantially rectangular cross section in peripheral engagement with said shaft, the transverse dimension of the member equaling the diameter of said shaft whereby each of said actuating mechanisms in being displaced radially inwardly toward the longitudinal axis of said shaft so as to effect flexure thereof is slideably confined between the contacting faces of the pair of actuating mechanisms lying along the other one of said mutually perpendicular axes whereby translation of the other pair of actuating mechanisms is obviated.

7. A mechanism as defined in claim 4 wherein each of said actuating mechanisms comprises a pivot arm member pivotable about one of four mutually perpendicular axes and includes a transversely extending end member in peripheral engagement with said shaft, said pivot arm member upon being actuated causing the transversely extending end member to translate substantially radially with respect to said shaft.

References Cited
UNITED STATES PATENTS 2,374,435    4/1945    Jordan      74—483UX MILTON KAUFMAN, Primary Examiner